Feb. 25, 1964  D. SAPONARA ETAL  3,122,197
RADIANT BURNER

Filed June 28, 1961  2 Sheets-Sheet 1

INVENTORS
DOMENICK SAPONARA
WAYNE T. KEMP
BY Louis Necho
ATTORNEY

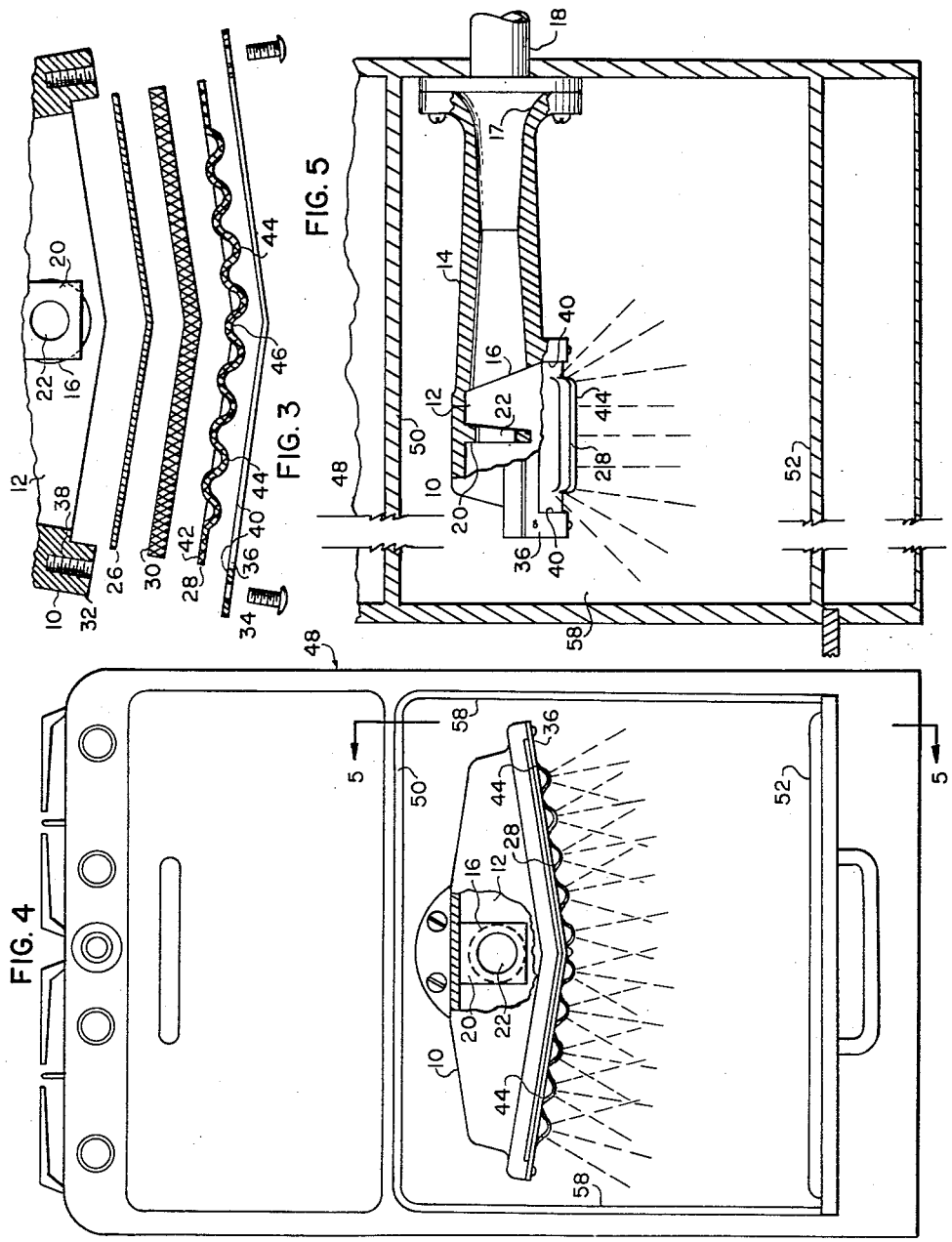

United States Patent Office 3,122,197
Patented Feb. 25, 1964

3,122,197
RADIANT BURNER
Domenick Saponara, Allentown, and Wayne T. Kemp, Kutztown, Pa., assignors to Caloric Appliance Corporation, Topton, Pa., a corporation of Pennsylvania
Filed June 28, 1961, Ser. No. 120,379
6 Claims. (Cl. 158—116)

This invention relates to a radiant heater, or burner, in which a fluid fuel, such as gas, is burned on the surface of a screen to heat the screen to incandescence and it relates more particularly to a radiant burner of the type set forth which is adapted for use in the broiler compartment of a gas burning cooking stove; or in a space heater, or in other applications.

One object of the invention is to produce an improved radiant burner of the type set forth.

It is known that, other things being equal, and within limits, the rate and efficiency of combustion are increased as the amount of air mixed with the gas approaches the maximum amount needed for complete combustion of the fuel. This is true of natural gas, for which the ratio of air to gas should be about ten to one. It is therefore a further object of the invention to produce an improved radiant burner construction in which the flow of injected gas entrains the major portion of the primary combustion air required, even when, as in the case of natural gas, the gas is injected under a relatively low pressure.

It is also known (a) that, other things being equal, and the heat input per unit area being sufficient and constant, the radiant energy emitted increases with the increase of the radiating area and that a flat screen presents the smallest area included within a given perimeter; (b) that a screen repeatedly heated to incandescence, and cooled, undergoes extremes of expansion and contraction, and that a flat screen, so heated and cooled will be permanently deformed, especially if its edges are tightly clamped.

It is therefore a still further object of the invention to produce an improved radiant heater in which: (a) the radiating surface of the screen is increased without increasing the perimeter thereof, and (b) the radiating screen can be repeatedly heated to incandescence and cooled without any permanent deformation.

A radiant burner includes an outer, combustion-sustaining screen which is heated to incandescence and at least one inner foraminous member such as a screen which shields the burner head from the flame on the outside surface of the outer screen. The outer screen is heated to a much higher temperature than the inner foraminous member and, if the outer screen is flat and contacts the inner foraminous member over its entire surfaces, the movement of the outer screen, due to its greater expansion and contraction, will be impeded and will exert a drag on the inner foraminous member with permanent deformation or damage to one, or both, of these elements. It is therefore a still further object of the invention to produce an improved burner in which the contact between the outer screen and the inner forminous member is reduced to a minimum so as to permit relative movement of the screens without damage to either of them.

For uniform results, it is necessary to have uniform combustion over the entire surface of the radiating screen and the more rapid the combustion, the greater the incandescence and the greater the amount of radiation. It is therefore a still further object of the invention to produce an improved radiant burner construction in which the distribution of fuel over the surface of the combustion-sustaining screen is maintained uniform and in which the rate of combustion is accelerated.

These and other objects are attained by our invention which is set forth in the following specification and in the accompanying drawings in which:

FIG. 3 is a longitudinal, sectional, exploded view taken on line 3—3 on FIG. 1, better to show how the parts of FIG. 2 are assembled.

FIG. 4 is a front elevational view showing a broiler compartment provided with a radiant burner embodying the invention.

FIG. 5 is a side elevational view looking in the direction of line 5—5 on FIG. 4.

Figures 1, 2:
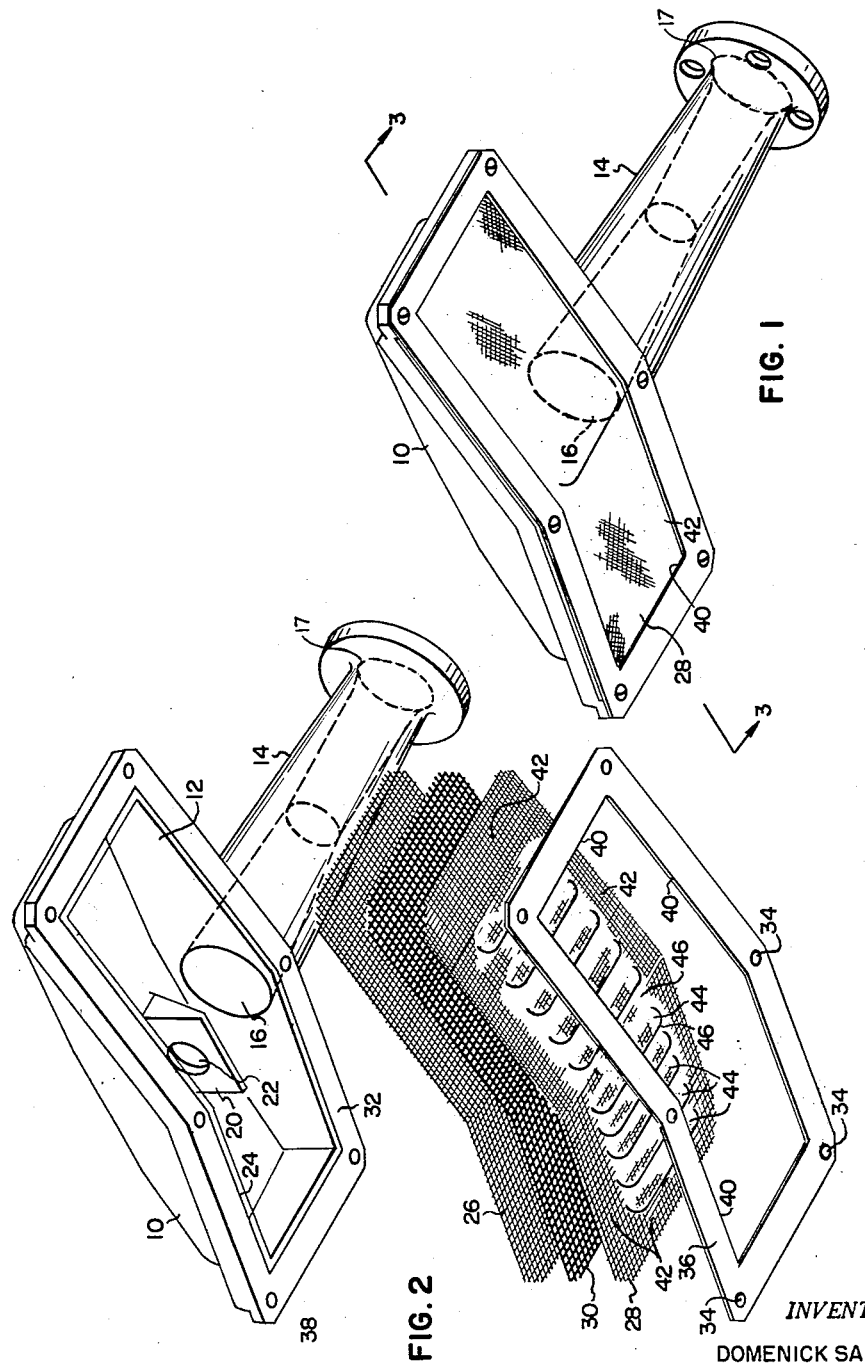
FIG. 1 is a bottom perspective view of a radiant burner embodying the invention, showing the position of the burner when used in the broiler compartment of a cooking stove.
FIG. 2 is a bottom, perspective, exploded view showing parts of which the burner of FIG. 1 is formed.

A radiant burner embodying this invention includes a casting or burner head 10, which defines a cavity 12, and a mixing chamber 14, the inner end 16 of which leads into burner cavity 12 and the outer end 17 of which is adapted to receive gas from pipe 18. The mixing chamber may be conventional but, for more efficient and rapid combustion, it is necessary to have an ample supply of primary combustion air which, in the case of natural gas, should be in the ratio of approximately ten parts of air to one part of gas. If the end 17 of the mixing chamber is cylindrical, the amount of air entrained by the gas flowing from pipe 18, especially when low pressure gas is used, will fall short of the required volume. To insure an adequate supply of combustion air, the mixing chamber is made in the nature of an oversize venturi, and its outer end 17 is made bell shaped, and of larger diameter than the rest of the venturi tube, as shown in FIG. 5. By this arrangement, the amount of combustion air entrained by the gas, even if the gas is delivered at a relatively low pressure, will be adequate. Laboratory experiments have shown that the air inlet end 17 of a venturi supplying a radiant burner having a 12,000 B.t.u. rating, should be about twice as large as the air inlet end of a venturi supplying a conventional ported burner, such as that found on the top of a cooking stove and having the same B.t.u. rating. To prevent excess pressure of the combustible mixture at the center of the cavity, a baffle 20 having an aperture 22 is located between inlet end 16 of the mixing chamber and the opposite wall 24 of the burner cavity, as best seen in FIG. 2.

The radiant burner illustrated also includes an inner, foraminous member such as a fine mesh screen 26, an outer, flexible fine mesh screen 28, and an intermediate, coarse mesh screen or other relatively non-flexible foraminous members 30. The flow capacities of elements should equal that of a 40 mesh screen and the flow capacity of intermediate member 30 should equal that of an 8 mesh screen. Elements 26, 28 and 30 are assembled in the relation shown in FIGS. 2 and 3. The assembled screens may be secured to the rim 32 of the burner casting by means of screws, or the like, which pass through openings 34 in a fastening strip 36 and through similar holes in a gasket, not shown, to engage openings 38 in the rim of the burner cavity. When thus secured, the outer margins of members 26, 28 and 30 will be clamped, in leak-proof manner, between fastening strip 36 and rim 32. Outer screen 28 is repeatedly heated to incandescence and cooled which means it must expand and contract considerably. If screen 28 is made flat and if its edges are tightly clamped, the expansion and contraction to which the screen is subjected will permanently deform the screen. If, to permit expansion and contraction, the edges of screen 28 are clamped loosely, ignited gases will seep in around the periphery of the screen with resultant explosions. In order to permit tight clamping of the edges of the screens and to guard against permanent distortion, outer screen 28 is corrugated, so as to form loops or substantially U-shaped formations 44 and inverted U-shaped formations or loops 46, as viewed in FIG. 3. The U-shaped formations referred to permit screen 28 to expand and to contract without any permanent distortion. These U-shaped formations also materially increase the total surface area of the screen and, hence, the total radiant energy emitted. Since outer screen 28 is heated, and expands, to a much higher degree than intermediate member 30, it must, when it expands and contracts, move relative to member 30. If the outer screen 28 has full, or substantially full surface contact with member 30 (or in the absence of member 30, with member 26) its movement due to expansion and contraction will be impeded with consequent deformation, or other damage. According to the present invention, the bight portions of U-shaped formations 46 will have substantially line contact with the surface of the member immediately inward of screen 28, such as member 30 (or member 26). This greatly facilitates the movement of outer screen 28 and reduces the risk of damage.

Intermediate screen or foraminous member 30 is strong enough to provide the necessary rigidity and to provide sufficient mass to absorb and enough surface to dissipate most of the inwardly radiated heat. Any residual heat is absorbed and dissipated by inner fine screen 26 so that the temperature in the burner cavity will always be below the flash point of the combustible mixture.

What we claim:
1. A radiant burner comprising
a casting defining a cavity,
one side of said casting having an opening formed therein,
the remaining surface of said side defining a flat rim surrounding said opening,
a venturi tube connected, in fluid flow relation, to the interior of said cavity to convey gas and air thereinto,
a first flat, foraminous member covering said opening,
a second, flexible, foraminous, combustion-sustaining member including
a central portion which overlies said opening and the corresponding portion of said first member,
said central portion being fabricated to provide a number of parallel, U-shaped formations which cover said opening,
the bight portions of some of said U-shaped formations having substantially line contact with said first member,
the bight portions of the remaining U-shaped formations of said central portion being tangent to a plane spaced from, and parallel to, the plane of said first member,
the distance between said planes being greater than the combined thickness of said first and second members,
and means detachably clamping the peripheries of both of said screens to said rim.

2. The structure recited in claim 1 and an intermediate foraminous member between said outer and inner members.

3. The structure recited in claim 1 in which said rim is formed of two substantially co-equal portions joined at an obtuse angle at the center of the cavity to form a dihedron, the angle of which faces said cavity.

4. The structure recited in claim 1 in which the end of the venturi tube remote from the cavity is of a larger diameter than any other portion of said tube.

5. The structure recited in claim 4 in which said end of the venturi tube is bell-shaped to facilitate aspiration of ambient air thereinto.

6. A radiant burner comprising
a casting defining a cavity,
one side of said casting having an opening formed therein,
the remaining surface of said side defining a flat rim surrounding said opening,
a venturi tube connected, in fluid flow relation, to the interior of said cavity to convey gas and air thereinto,
a first, flat, foraminous member covering said opening,
a second, flexible, foraminous, combustion-sustaining member including
a central portion which overlies said opening and the corresponding portion of said first member,
said central portion being fabricated to provide a number of parallel, U-shaped formations which cover said opening,
the bight portions of selected U-shaped formations having substantially line contact with said first member,
the bight portions of the remaining U-shaped formations of said central portion being tangent to a plane spaced from, and parallel to, the plane of said first member,
the distance between said planes being at least greater than the thickness of said second member,
and means detachably clamping the peripheries of both of said screens to said rim.

References Cited in the file of this patent
UNITED STATES PATENTS

| | | |
|---|---|---|
| 366,780 | Love | July 19, 1887 |
| 993,554 | Sanford | May 30, 1911 |
| 2,235,635 | Herman | Mar. 18, 1941 |
| 2,336,816 | Thompson | Dec. 14, 1943 |
| 2,514,170 | Walter et al. | July 4, 1950 |
| 2,997,941 | Phelan et al. | Aug. 29, 1961 |
| 3,029,866 | Honger | Apr. 17, 1962 |
| 3,040,805 | Lambert | June 26, 1962 |

FOREIGN PATENTS

| | | |
|---|---|---|
| 5,784 | Australia | Jan. 20, 1932 |
| 1,056,454 | France | Oct. 21, 1953 |
| 826,673 | Great Britain | Jan. 20, 1960 |